US012741468B2

(12) United States Patent
Oldorff et al.

(10) Patent No.: US 12,741,468 B2
(45) Date of Patent: Sep. 22, 2026

(54) METHOD FOR PRINTING A PAPER, AND DIGITAL PRINTING DEVICE

(71) Applicant: SWISS KRONO Tec AG, Lucerne (CH)

(72) Inventors: Frank Oldorff, Schwerin (DE); Falko Geitz, Zernitz-Lohm (DE)

(73) Assignee: SWISS KRONO TEC AG, Lucerne (CH)

( * ) Notice: Subject to any disclaimer, the term of this patent is extended or adjusted under 35 U.S.C. 154(b) by 131 days.

(21) Appl. No.: 18/860,930

(22) PCT Filed: May 2, 2023

(86) PCT No.: PCT/EP2023/061579
§ 371 (c)(1),
(2) Date: Oct. 28, 2024

(87) PCT Pub. No.: WO2023/213828
PCT Pub. Date: Nov. 9, 2023

(65) Prior Publication Data

US 2025/0296342 A1 Sep. 25, 2025

(30) Foreign Application Priority Data

May 5, 2022 (EP) .................................... 22171945

(51) Int. Cl.
*B41J 29/377* (2006.01)
*B41J 2/045* (2006.01)
(Continued)

(52) U.S. Cl.
CPC ........... *B41J 2/1714* (2013.01); *B41J 2/0451* (2013.01); *B41J 2/04563* (2013.01);
(Continued)

(58) Field of Classification Search
CPC .... B41J 2/1714; B41J 2/0451; B41J 2/04563; B41J 2/04568; B41J 2/04586; B41J 29/377; B41J 25/00; B41J 2025/008
See application file for complete search history.

(56) References Cited

U.S. PATENT DOCUMENTS 8,845,072 B2 * 9/2014 Hawryschuk .............. B41J 2/14
347/34
10,479,124 B2 11/2019 Moriguchi et al.
(Continued)

FOREIGN PATENT DOCUMENTS

EP 3763533 A1 1/2021
JP 2008268637 A * 11/2008 ............... G02B 5/20
WO 2021008817 A1 1/2021

OTHER PUBLICATIONS

International Search Report issued on Jul. 5, 2023 in Application No. PCT/EP2023/061579; 12 pages.

*Primary Examiner* — Yaovi M Ameh
(74) *Attorney, Agent, or Firm* — Andrew M. Calderon; Calderon Safran & Wright P.C.

(57) ABSTRACT

The disclosure relates to a method for printing a paper by a digital printing system which has a plurality of ink application units for applying printing ink of different colours to the paper. The paper to be printed is guided past the ink application units in a feed direction. The digital printing system has a device which is designed and suitable for preventing or reducing the formation of condensation on the ink application units, and this device is used to prevent or reduce the formation of condensation on the ink application units. The device has a temperature-control device and an electrical controller, wherein the temperature-control device is designed to influence a temperature of the ink application units, and the electrical controller is designed to control the temperature-control device in such a way that the ink
(Continued)

application units have different temperatures. The temperatures of the ink application units increase in the feed direction and temperatures of two adjacent ink application units differ by at least 0.5° C. and by at most 1.5° C. The temperatures of the first ink application unit in the feed direction and of the last ink application unit in the feed direction differ by at most 10° C.

14 Claims, 1 Drawing Sheet

(51) Int. Cl.
*B41J 2/17* (2006.01)
*B41J 25/00* (2006.01)

(52) U.S. Cl.
CPC ....... *B41J 2/04568* (2013.01); *B41J 2/04586* (2013.01); *B41J 29/377* (2013.01); *B41J 25/00* (2013.01); *B41J 2025/008* (2013.01)

(56) References Cited

U.S. PATENT DOCUMENTS

2013/0293618 A1* 11/2013 Tunmore .................. B41J 2/14 347/17
2017/0341399 A1 11/2017 Arimizu et al.
2021/0031508 A1* 2/2021 Kachi ................. B41J 2/14201
2022/0242118 A1 8/2022 Galliker
2022/0266609 A1 8/2022 Fischer

* cited by examiner

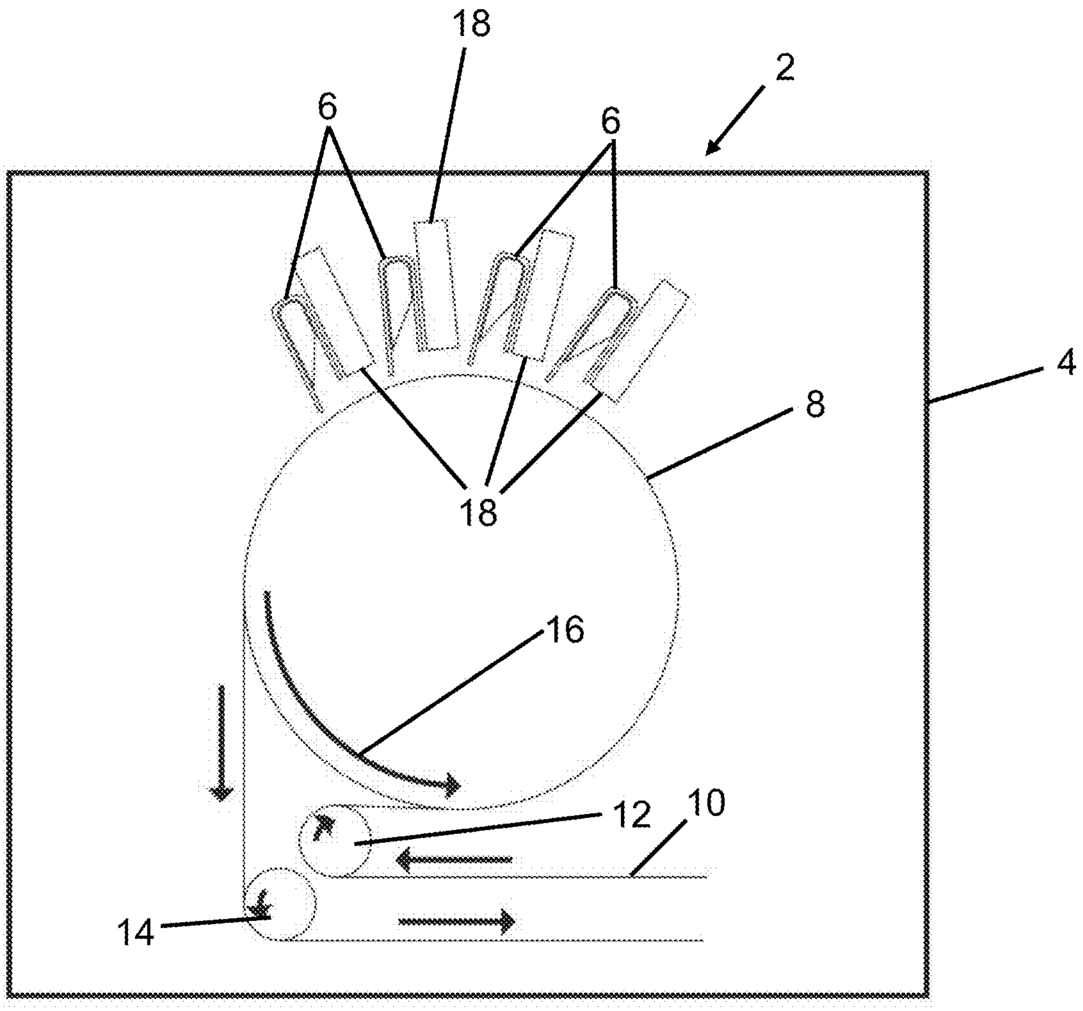
18
2
6
6
4
8
18
16
12
10
14

METHOD FOR PRINTING A PAPER, AND DIGITAL PRINTING DEVICE

FIELD OF INVENTION

The invention relates to method for printing on a paper by means of a digital printing facility which has multiple ink application units for applying printing ink of different colors to the paper, wherein the method involves guiding the paper to be printed on past the ink application units in a feed direction, wherein the device comprises a temperature control device and an electrical control unit, the temperature control device being configured to influence a temperature of the ink application units and the electrical control unit being configured to control the temperature control device in such a way that the ink application units are at different temperatures, characterized in that the temperatures of the ink application units increase in the feed direction and the temperatures of two neighboring ink application units differ by at least 0.5° C. and by at most 1.5° C. wherein the temperatures of the first ink application unit in the feed direction and the last application unit in the feed direction differ by at most 10° C. The invention also relates to a digital printing facility that is able and configured to print on a paper using such a method.

BACKGROUND

Printing onto paper has been known from the prior art for many years. Printed papers are used for various purposes. For example, in the form of decorative paper, i.e. paper onto which a decor has been printed, they can be used to produce laminate panels, floor panels or wall and ceiling coverings, but also furniture boards. In the process, the desired decor, such as a real wood decor, is printed onto a paper web or paper sheet. This is then pressed, for example, with a core, preferably a wood-based material panel.

Digital printing facilities which can print onto paper have also been known for many years. So-called single-pass digital printing facilities, in which the paper to be printed only has to pass through the printing facility once, are used in the packaging industry, for example, to print onto packaging materials, such as cardboard boxes. However, the requirements for the print and the quality of the resulting decor are considerably lower in this case than for the production of decorative papers, for example for the aforementioned purposes. This applies to both the quality of the individual print of the decor and the reproducibility of the decors, which often have to be produced in large quantities. Moreover, decorative papers with the same decor are often produced in different batches with very large time intervals in between, meaning the demand on reproducibility is increased even further.

It known from the prior art that various parameters influence the quality of the decor produced. For example, this relates to the paper used, the quantity and type of printing ink applied and, where applicable, the quantity and type of the primer used, which can also be referred to as a primer coating, but also to environmental factors such as humidity or temperature. However, these parameters, which cannot usually be optimized independently from other, but rather have a mutual impact on one another, not only have an influence on the paper to be printed on, but also on the digital printing facility used for printing. For example, it is known that a build-up of condensation on the print head may occur. This has a negative impact on the quality of the print results. Due to the condensation on the print head, individual nozzles of the print head, through which ink passes, may become clogged and blocked. This may lead to the failure of a whole print head. To prevent this from happening, increased cleaning efforts are required to remove any condensation that forms. In addition, this cleaning means that a cleaning liquid used for cleaning purposes is required and used up, which increases production costs. Printing ink is also expended during cleaning, which likewise has disadvantageous effects.

If condensation is not recognised and removed in time, it can lead to the production of rejects, which also increases the costs of production and the necessary use of materials, leads to longer downtimes of the printing facility and results in increased maintenance and repair costs.

SUMMARY

The invention is therefore based on the task of proposing a method with which safe and continuous production can be enabled more effectively.

The invention solves the task addressed by way of a method for printing onto a paper by means of a digital printing facility which has multiple ink application units for applying printing ink of different colors to the paper, wherein the method involves guiding the paper to be printed on past the ink application units in a feed direction, wherein the device comprises a temperature control device and an electrical control unit, the temperature control device being configured to influence a temperature of the ink application units and the electrical control system being configured to control the temperature control device in such a way that the ink application units are at different temperatures, the method being characterized in that the digital printing installation comprises a device which is configured and suitable for preventing or reducing the formation of condensation on the ink application units, and this device is used to prevent or reduce the formation of condensation on the ink application units, the method being characterized in that that the temperatures of the ink application units increase in the feed direction and the temperatures of two adjacent ink application units differ by at least 0.5° C. and by at most 1.5° C., the temperatures of the first ink application unit in the feed direction and the last ink application unit in the feed direction differing by at most 10° C.

Consequently, the paper to be printed on is guided past the various ink application units within the digital printing facility. In the process, the printing ink to be applied by the respective ink application unit is applied to the paper. Once the paper has been guided past all available ink application units, the desired decor is printed on the paper.

Rather than having to remove any resulting condensation, as is the case in the prior art, and/or maintaining, cleaning or repairing the printing facility, the invention renders it possible to reduce or completely prevent the build-up of condensation, thereby solving the problem. According to the invention, a device is provided for this purpose which preferably constitutes part of the digital printing facility, and is configured and able to prevent or reduce the build-up of condensation. In the method according to the invention, it does perform this task. In particular, this means that less condensation develops in a digital printing facility with said device than in a digital printing facility without it. This applies in particular when otherwise identical parameters are used.

According to the invention, the device has a temperature control device and an electrical control unit. The temperature control device is configured to influence a temperature of the ink application units. This can be done in different directions. The temperature control device preferably comprises a heater, which is configured to increase the temperature of the ink application units. Particularly preferably, the heater is configured to increase the temperature of the ink application units independently from each other. Alternatively or additionally, the temperature control device preferably has a cooler, which is configured to reduce the temperature of the ink application units. Particularly preferably, the cooler is configured to reduce the temperature of the ink application units independently from each other.

The electric control unit is configured to control the temperature control device. In a preferred embodiment, the digital printing facility has at least one temperature sensor. Particularly preferably, the digital printing facility has at least one temperature sensor per ink application unit. The temperature sensor is configured to transmit measurement data to the electrical control unit containing information on the temperature of the respective ink application unit. It is thus possible to measure the temperature. The electrical control unit is preferably configured to access an electronic memory in which a target temperature value for the respective ink application unit is stored. The electrical control preferably is or contains an electronic data processing device. The electrical control unit compares the temperature of an ink application unit measured by the sensor with the target temperature stored in the electronic memory and is configured to control the temperature control device on the basis of the result of this comparison. If the measured temperature deviates from the target temperature by more than a predetermined value, the electrical control unit sends control signals to the temperature control device, which then changes the temperature of the ink application unit. If the measured temperature is greater than the stored target temperature, the cooler of the temperature control device is controlled by the control signals and reduces the temperature. If the measured temperature is lower than the stored target temperature, the heater of the temperature control device is controlled by the control signals.

According to the present invention the electrical control unit is configured to control the temperature control device in such a way that the ink application units are at different temperatures. Particularly preferably, the temperatures of the ink application units increase in the feed direction. This design is based on the knowledge that the quantity of liquid printing ink applied to the paper increases in the feed direction. This also increases the risk of a build-up of condensation from the amount of liquid applied. The higher the temperature of the ink application unit, the lower the likelihood that any liquid found in the area surrounding the ink application unit will condense on the ink application unit. Therefore, it is generally advantageous if the temperatures of the ink application units increase in the feed direction.

The temperatures of two neighboring ink application units differ by at least 0.5° C., preferably by at least 0.7° C., especially preferably by at least 1.0° C. The temperatures of two neighboring ink application units preferably differ by at most 1.5° C., preferably at most 1.3° C., especially preferably at most 1.0° C.

In one specific embodiment example, the digital printing facility has, for example, four ink application units, the temperatures of which increase in the feed direction. In this specific embodiment example, the temperature of the first ink application unit is 29° C., the second ink application unit is 30° C., the third printing unit is 31° C., and the fourth printing unit is 32° C.

On the one hand, it is advantageous if the temperature between the paper to be printed on and the print head is as low as possible, so as to reduce the risk of a build-up of condensation. Since the paper also heats up as it passes through the digital printing facility, it is advantageous if the temperature of the ink application units also increases in the feed direction. On the other hand, the quantity of printing ink applied by the respective ink application unit increases as the temperature of the ink application unit increases. It is therefore advantageous to limit the overall difference in temperature between the first and last ink application unit. The temperatures of the first ink application unit in the feed direction and the last ink application unit in the feed direction differ by at most 10° C., preferably at most 7° C., especially preferably at most 5° C.

In one preferred embodiment, the device has at least one air stream deflector that is arranged between two ink application units and is configured and able to deflect an air flow from one ink application unit to an adjacent ink application unit. An air stream that would flow from one ink application unit to an adjacent ink application unit without the air stream deflector is thus deflected by the air stream deflector. An air stream deflector can be designed, for example, in the form of a wall or a board that is placed or positioned in the path of the actual air flow. This is particularly advantageous in order to prevent a spray of printing ink, which is produced when the printing ink leaves the ink application unit, from being directed or blown from one ink application unit to the adjacent ink application unit by air flows which may be caused, for example, by the moving parts of the digital printing facility, by the paper moving through the digital printing facility and/or by air flows in the hall in which the method is carried out. This also reduces the amount of liquid at the point of the neighboring ink application unit, which lowers the risk of a build-up of condensation.

Particularly preferably, the device has at least one air stream deflector between each two neighboring ink application units. This means that whenever two ink application units are arranged adjacent to one another, there is at least one air flow deflector between these two ink application units.

The device preferably has at least one air suction device that is arranged between two neighboring ink application units and is able and configured to suck away air between the two ink application units. Particularly preferably, the device has at least one air suction device between each two neighboring ink application units. This means that whenever two ink application units are arranged adjacent to one another, there is at least one air suction device between these two ink application units. The air suction device sucks away an ink spray produced when the printing ink leaves the ink application unit. The air suction device is preferably part of a cooler of the temperature control device.

Advantageously, the device has a housing that surrounds the ink application units. This can keep moisture, spray and other factors that accelerate or aid the build-up of condensation away from the print heads of the ink application units.

In one preferred embodiment, the digital printing facility has a monitoring unit that is configured to detect a build-up of condensation on at least one ink application unit.

The invention also solves the task addressed by way of a digital printing facility of the type described here which is configured and able to print onto the paper in the method described here.

DETAILED DESCRIPTION OF DRAWINGS

In the following, an embodiment example of the invention will be explained in more detail with the aid of the accompanying FIGURE. It shows:

The FIGURE shows the schematic view of a digital printing facility according to an embodiment example of the present invention.

DETAILED DESCRIPTION

The FIGURE depicts a digital printing facility with a printing unit 2 surrounded by a housing 4. It has four ink application units 6, each of which can apply printing ink in one color. Further ink application units 6 are possible as an option. The ink application units 6 apply the printing ink to a printing cylinder 8. In the embodiment example shown, the paper 10 to be printed on is inserted through an opening, not depicted, into the housing 4 from the right and is guided over a first tension pulley 12, the printing cylinder 8 and a second tension pulley 14. The printing cylinder 8 does not serve to transfer printing ink to the paper 10, but to guide the paper 10 past the ink application units 6. The feed direction is indicated by the arrow 16, which represents the direction of rotation of the printing cylinder 8.

Within the housing 4 of the printing unit 2, a device 18 is arranged between each two neighboring ink application units, said device being configured to reduce or completely prevent the build-up of condensation on the ink application units 6. In the embodiment example shown, the device 18 is an air suction unit, depicted only schematically, and an air flow deflector. The housing 4 also ensures a smaller build-up of condensation on the ink application units 6 and thus also constitutes part of the device 18.

The invention claimed is:

1. A method for printing on a paper by a digital printing facility which has multiple ink application units for applying printing ink of different colors to the paper, the method comprises guiding the paper to be printed on past the ink application units in a feed direction, the digital printing facility comprising a device configured to prevent or reduce a build-up of condensation on the ink application units, and the build-up on condensation on the ink application units is prevented or reduced by the device, the device further comprising a temperature control device and an electrical control unit, the temperature control device being configured to influence a temperature of the ink application units and the electrical control unit being configured to control the temperature control device in such a way that the ink application units are at different temperatures, wherein the temperatures of the ink application units increase in the feed direction and the temperatures of two adjacent ink application units differ by at least 0.5° C. and at most 1.5° C., wherein the temperatures of a first ink application unit in the feed direction and a last ink application unit in the feed direction differ by at most 10° C.

2. The method according to claim 1, wherein the temperatures of two adjacent ink application units differ by at least 0.7° C.

3. The method according to claim 1, wherein the temperatures of the first ink application unit in the feed direction and the last ink application unit in the feed direction differ by at most 7° C.

4. The method according to claim 1, wherein the device has at least one air stream deflector that is arranged between two ink application units and is configured and able to deflect an air flow from one ink application unit to an adjacent ink application unit.

5. The method according to claim 4, wherein the device has at least one air stream deflector between each two adjacent ink application units.

6. The method according to claim 1, wherein the device has at least one air suction device that is arranged between two ink application units and is configured and able to suck away air between the two ink application units.

7. The method according to claim 6, wherein the device has at least one air suction device between each two adjacent ink application units.

8. The method according to claim 1, wherein the device has a housing that encloses the ink application units.

9. The method according to claim 1, wherein the digital printing facility comprises a monitoring unit which is configured to detect a build-up of condensation on at least one ink application unit.

10. A digital printing facility that is able and configured to print on a paper using a method according to claim 1.

11. The method according to claim 1, wherein the temperatures of two adjacent ink application units differ by at least 1.0° C.

12. The method according to claim 1, wherein the temperatures of two adjacent ink application units differ by at most by 1.3° C.

13. The method according to claim 1, wherein the temperatures of two adjacent ink application units differ by at most 1.0° C.

14. The method according to claim 1, wherein the temperatures of the first ink application unit in the feed direction and the last ink application unit in the feed direction differ by at most 5° C.

* * * * *